United States Patent [19]
Crispe

[11] 3,983,798
[45] Oct. 5, 1976

[54] APPARATUS FOR MAKING WAFER BISCUITS

[76] Inventor: Stanley William Crispe, 44 Bowring Park Ave., Liverpool, Lancashire, England

[22] Filed: Sept. 3, 1974

[21] Appl. No.: 502,866

[30] Foreign Application Priority Data
Sept. 25, 1973 United Kingdom............... 44786/73

[52] U.S. Cl. ............................................. 99/450.4
[51] Int. Cl.² ....................... A21C 9/04; A21C 9/08
[58] Field of Search............ 99/450.1, 450.4, 450.5, 99/450.7; 426/274, 302

[56] References Cited
UNITED STATES PATENTS

| | | | |
|---|---|---|---|
| 2,923,257 | 2/1960 | Monaco ............................. | 99/450.4 |
| 3,119,352 | 1/1964 | Fay ..................................... | 99/450.4 |
| 3,448,695 | 6/1969 | Werner .......................... | 99/450.4 X |

Primary Examiner—Stanley N. Gilreath
Assistant Examiner—Alan Cantor
Attorney, Agent, or Firm—Norris & Bateman

[57] ABSTRACT

An apparatus for producing a wafer biscuit, wherein a plurality of cream dispensers are provided in side-by-side relationship, each coupled to a wafer feed magazine, the cream dispensers being operable selectively, simultaneously or separately, thus automatically to dispense one or more creams onto a respective wafer or wafers, the latter being then transferred in line to a wafer builder.

12 Claims, 14 Drawing Figures

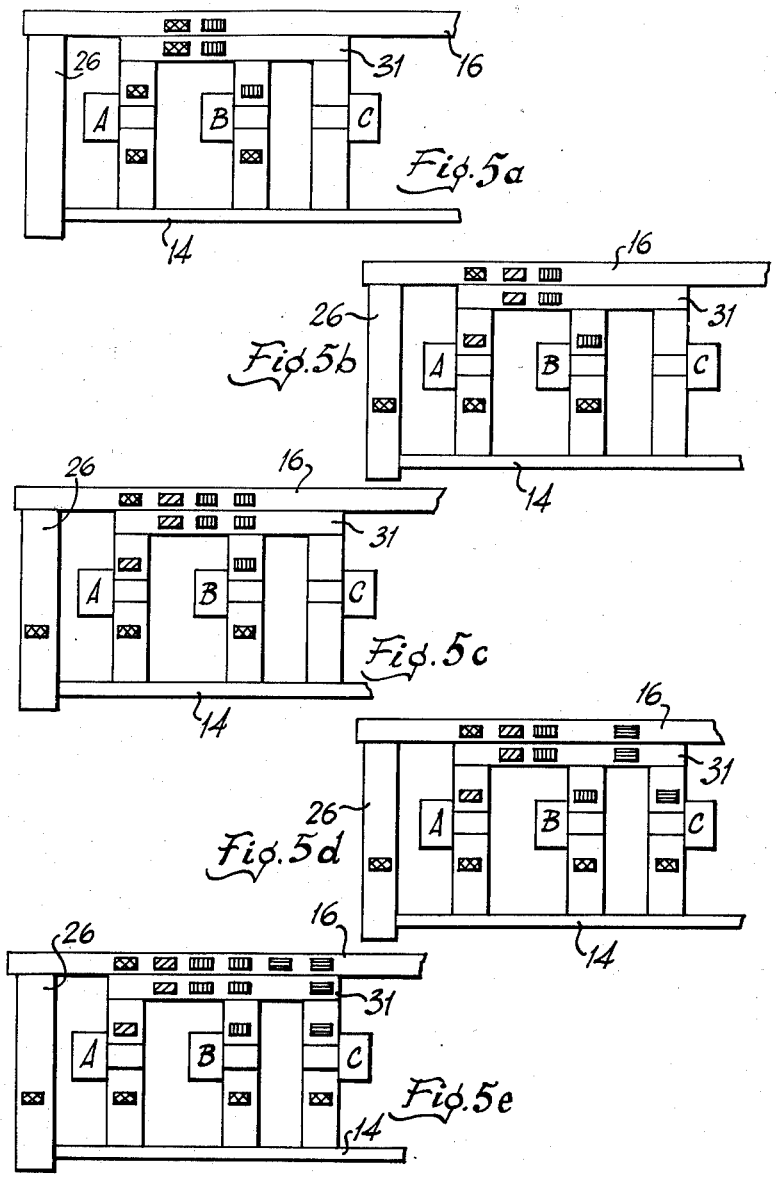

APPARATUS FOR MAKING WAFER BISCUITS

This invention relates to apparatus for producing a wafer biscuit and is particularly, though not exclusively, concerned with the ability automatically and selectively to produce multi-layered wafer sandwiches having different cream fillings.

In one known method a multi-layered wafer sandwich is produced by successive operations of a cream dispenser adapted to deposit a layer of cream onto a wafer passing therebelow. The device operates successively to emit a number of creamed wafers which are subsequently assembled in a superimposed manner. With this method a single cream alone is used.

In an alternative method wherein different creams can be used, a plurality of cream dispensers are arranged in an aligned manner. A first wafer travels below the first dispenser, is creamed and then travels successively below the remaining dispensers for further creaming and as it passes between each successive pair of dispensers a further wafer is manually placed over the layer of cream dispensed by the immediately preceding dispenser. In this manner a sandwich is built and the dispensers can be arranged to dispense different coloured and flavoured creams if required.

Of these two methods therefore, in the one case a single cream only can be used, and in the other, the process is inherently slow in view of the manual application of wafers between successive cream dispensers.

An object of the present invention is to provide an apparatus for producing single or multi-layered wafer biscuits automatically and selectively with one or more different creams and wherein the aforementioned disadvantages are avoided, or at least, alleviated.

According to the invention there is provided an apparatus comprising a plurality of cream dispensers, each coupled to a wafer feed magazine, means for actuating said cream dispensers selectively in accordance with a pre-determined programme, said actuating means enabling simultaneous or separate operation of selected ones of said cream dispensers, and further means disposed adjacent said cream dispensers adapted to transfer creamed wafers issuing therefrom for simultaneous conveyance to a wafer builder.

An embodiment of the invention will now be described, by way of example only, with reference to the accompanying drawings, in which:

FIGS. 5a to 5e are further diagrammatic plan views of the apparatus of FIG. 2 showing in each case the various stages of operation to produce wafer biscuits having different numbers of layers and/or creams.

Figure 1:
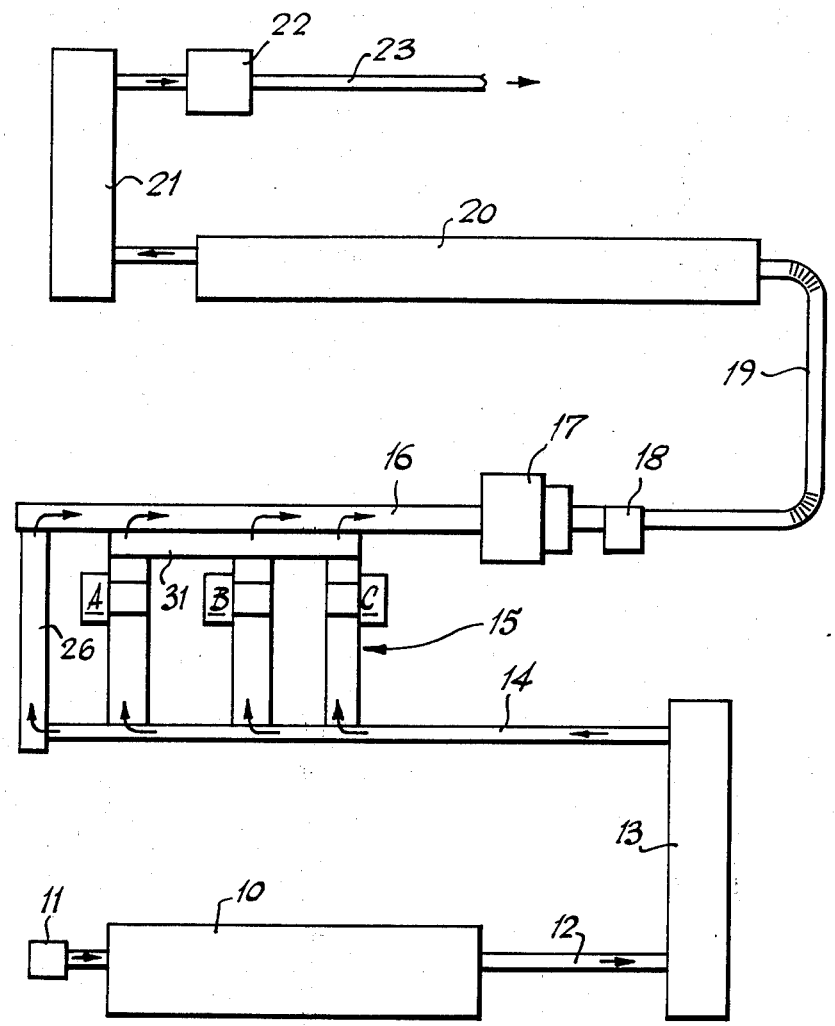
FIG. 1 is a schematic plan view of a plant for producing wafer biscuits and including apparatus in accordance with the invention.

A plant for producing wafer biscuits and including apparatus in accordance with the invention is arranged for convenience on three different levels of a building in which it is situated. The plant comprises a plurality of ovens on one level and generally indicated at 10, to which batter is fed by a pump 11. A conveyor 12 carries the wafers to an elevator 13 which carries them downwardly to a second level. A further conveyor 14 receives the wafers from the elevator 13 and transports them to apparatus comprising a creaming section generally indicated at 15 to be described in detail. The creaming section 15 produces one or more creamed wafers which, together with an uncreamed topping wafer, are carried successively in a substantially aligned manner on a further conveyor 16 into a wafer builder 17 which stacks them to form a multi-layered wafer sandwich. The sandwich is then transferred to a device 18 which determines its correct thickness before passing via a further conveyor 19, a cooling tunnel 20 and a further elevator 21 to a third level where the sandwich is fed to a cutting station 22 arranged to cut same into a number of biscuits of requisite size. The biscuits leaving the cutting station 22 are thereafter transferred by a conveyor 23 for packaging, for example.

The plant just described and illustrated in FIG. 1 is operated substantially automatically requiring only a few personnel for supervision.

Figure 2:
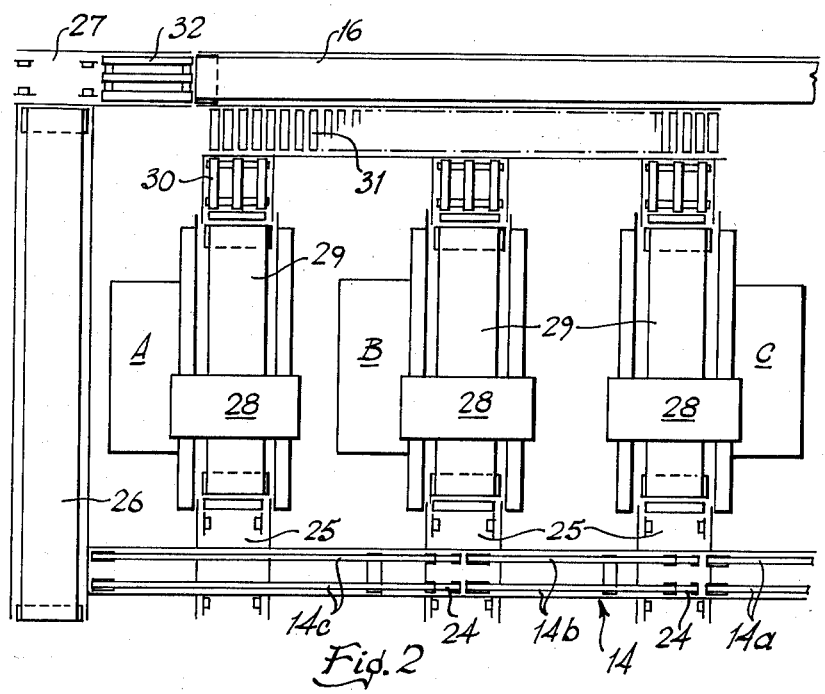
FIG. 2 is a more detailed plan view on a larger scale of said apparatus forming part of the plant of FIG. 1.
Figure 3:
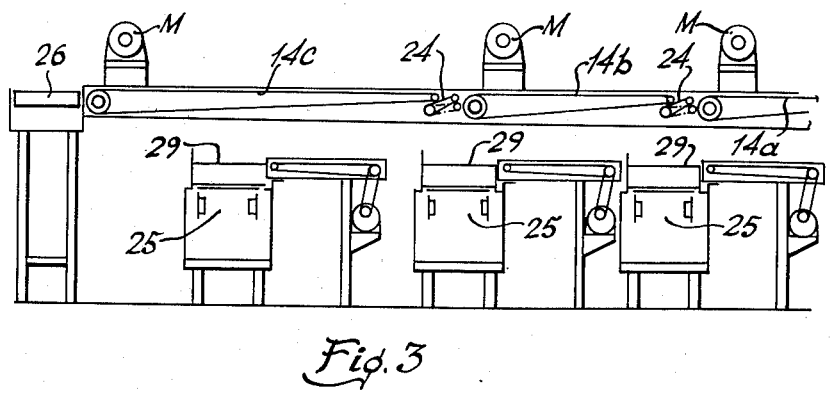
FIG. 3 is an elevation of the arrangement shown in FIG. 2.

Referring now to FIG. 2 and 3, wherein parts of the creaming section 15 are illustrated in greater detail, there are provided three cream dispensing stations A, B and C respectively arranged in side-by-side relationship and disposed between conveyors 14 and 16.

The conveyor 14 in the end region thereof remote from the elevator 13 is divided into three aligned conveyor sections comprising pairs of endless belts 14a, 14b and 14c driven by electric motors indicated by the reference M.

Three devices 24 (two of which are shown) are provided selectively to divert wafers from the conveyor 14 into wafer feed magazines 25 for the cream dispensers A, B and C respectively and via a conveyor section 26 into a further magazine 27. The devices 24 are movable between two positions selectively to divert a wafer into the respective magazines or alternatively to allow same to pass to the next succeeding magazine. In this manner the feed of wafers into the creaming section from the ovens can be maintained constant, and the devices 24 are operated automatically in a predetermined sequence for this purpose.

Each cream dispenser comprises a dispensing head 28 for placing a layer of cream onto wafers successively carried beneath the latter from the respective magazine 25 by a conveyor 29, each creamed wafer thereafter being transferred from the conveyor 29, via a short conveying section 30 onto a powered roller conveyor 31.

The roller conveyor 31 comprises a number of powered roller sections each adjacent the respective conveyor section 30 and adapted to carry creamed wafers therefrom to one side of the centre line of the respective cream dispenser. That is, with reference to FIG. 2 a first powered roller section carries creamed wafers to the right, a stop (not shown) being provided at about the mid-point between the short conveyor sections 30 for dispensers A and B respectively. Further powered roller sections adjacent the outputs of dispensers B and C are arranged to carry creamed wafers to the left, further stops being appropriately provided for these sections.

The powered roller conveyor 31 extends in parallel relationship with and immediately alongside the conveyor 16, the input end of which receives uncreamed topping wafers from the magazine 27 via a short conveyor section 32. Means are provided below the powered roller section 31, adapted to rise between the rollers and to transfer creamed wafers thereon onto the conveyor 16. Sensing means such as photo-electric cells are provided to effect this transfer when appropriate and to energise the short conveyor section 32 to transfer a topping wafer onto conveyor 16. Operation of the dispensers A, B and C is effected as will be described, upon actuation of respective ones of magazines 25.

FIGS. 4a to 4f illustrate diagrammatically a plurality of switching cam discs, in this case eight in number, which in practice are mounted for rotation on a common shaft 33, each disc carrying one or more cams adapted during rotation of the discs to actuate microswitches for connection as will be described, to the various magazines 25 for actuation thereof.

Figure 4A:
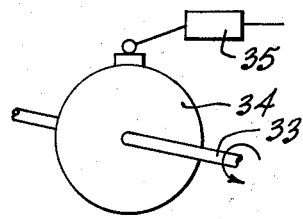
FIGS. 4a to 4f are schematic views of switching cam arrangements for actuating cream dispensers being part of the apparatus of FIG. 2.

FIG. 4a shows a cam disc 34 carrying a single cam for actuation of the micro-switch 35 which serves in use to initiate a switching cycle for the magazines to be actuated.

Figure 4B:
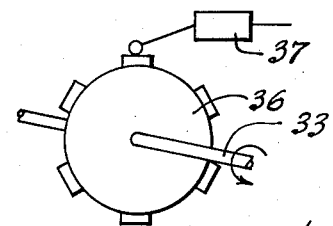

FIG. 4b shows a cam disc 36 having six cams for actuation of a micro-switch 37 for connection to the magazines of dispensers A and B.

Figure 4C:
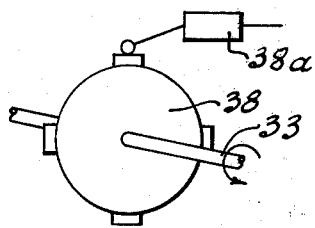

FIG. 4c shows a cam disc 38 having four cams for actuation of a micro-switch 38a for connection to the magazines of dispensers A and B.

Figure 4D:
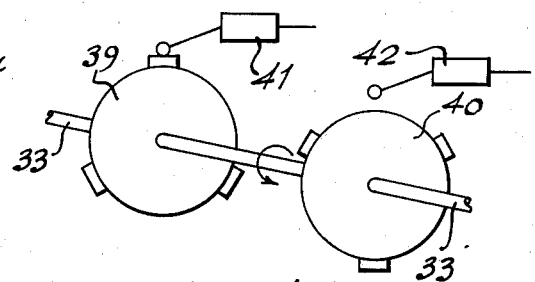

FIG. 4d shows two cam discs 39 and 40 each having three cams. The cams of disc 39 actuate a micro-switch 41 for connection to the magazines of dispensers A and B whilst the cams of disc 40 actuate a micro-switch 42 for connection to the magazine of dispenser B.

Figure 4E:
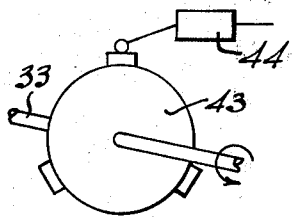

FIG. 4e shows a cam disc 43 having three cams for actuation of a micro-switch 44 for connection to the magazines of dispensers A, B and C.

Figure 4F:
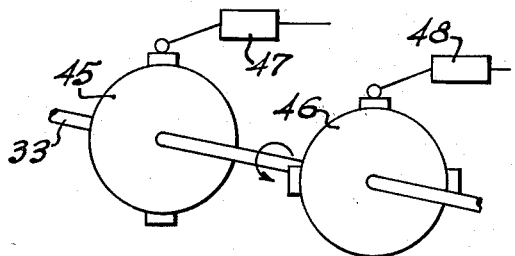

FIG. 4f shows cam discs 45 and 46, the former having two cams and the latter four cams. The cams of disc 45 actuate a micro-switch 47 for connection to the magazine of dispenser A, whilst the cams of disc 46 actuate a micro-switch 48 for connection to the magazines of dispensers B and C.

FIGS. 5a to 5e illustrate schematically a number of ways in which the creaming section can be selectively operated to produce a number of different wafer biscuits, each figure showing the section in several stages of operation.

The creaming section of the plant in accordance with the invention can be arranged to produce many different forms of wafer biscuit, such that, as the examples show, a maximum of three different creams can be used and a maximum of six creamed layers can be produced. Therefore, the cream dispensers are supplied with three creams respectively of different flavours and/or colours.

It is intended that the whole plant or at least the creaming section thereof shall be operable automatically upon selection of one of a number of programmes adapted selectively to produce multi-layered wafer biscuits of different forms. For this purpose a selector switch on a main control console will be arranged to switch in the circuits of selected ones of the micro-switches to cause energisation of the various parts of the apparatus in accordance with a programme selected.

The shaft 33 carrying the cam discs shown in FIGS. 4a to 4f is driven from an electric motor via a reduction gearbox in a conventional manner, the gearbox preferably being variable such that its output shaft can be driven at speeds between 1½ and 5 r.p.m. For the purpose of this description, it will be assumed that the shaft 33 is driven at a constant speed of 5 r.p.m. and that wafers are supplied to the creaming section from the ovens at a rate of 60 per minute, and also that the cream dispensers A, B and C are adapted respectively to supply vanilla, chocolate and strawberry flavoured creams.

The following table will serve together with FIGS. 5a to 5e to illustrate five possible selections for producing five different forms of wafer sandwich. The figures in the table denote the number of times the respective creamers and the topping wafer magazine 27 are actuated in a period of one minute, as well as the forms of wafer sandwich produced, in accordance with the respective selections.

| SELECTION | CREAMERS A | B | C | TOPPING WAFERS | TOTAL WAFERS | LAYERS | DIFFERENT CREAMS |
|---|---|---|---|---|---|---|---|
| 5a | 30 | 30 | — | — | 60 | 1 | 1 |
| 5b | 20 | 20 | — | 20 | 60 | 2 | 2 |
| 5c | 15 | 30 | — | 15 | 60 | 3 | 2 |
| 5d | 15 | 15 | 15 | 15 | 60 | 3 | 3 |
| 5e | 10 | 20 | 20 | 10 | 60 | 5 | 3 |

Referring now to FIG. 5a and selection number 5a in the table, the cam shaft 33 is rotated and the circuits of micro-switches 35 and 37 are energised. Upon actuation of the switch 35 a cycle commences and in one revolution of the shaft 33 the cams of disc 36 cause micro-switch 37 to be actuated 6 times. For this selection switch 37 is connected to the wafer feed magazine of cream dispensers A and B and the latter are energised 6 times each in the 12 second period of one revolution of the shaft 33. Thus as shown in the table in a period of one minute the magazines of dispensers A and B are each actuated 30 times thus utilising the full supply of wafers arriving at the rate of 60 per minute. In this selection a single-layer, single cream wafer biscuit is to be produced and it is, therefore, convenient to arrest the supply of cream in dispenser A and thus to use the latter simply to supply an uncreamed topping wafer. Thus magazine 27 and that of cream dispenser C are not used. The wafers leaving the dispensers A and B are moved respectively to the right and to the left on the powered roller conveyor 31 before being indexed forwardly onto the conveyor 16 for conveyance towards the wafer builder 17.

Referring now to FIG. 5b and selection number 5b in the table, the circuits of micro-switches 35 and 38a are energised. Once again, as in all of these examples, actuation of micro-switch 35 initiates an operational cycle, no signals being fed to the magazines until such time. In one revolution of cam disc 38 four signals from the micro-switch 38a serve to actuate the magazines of dispensers A and B 4 times at 3 second intervals. Therefore, as shown in the table these magazines are actuated 20 times each in 1 minute. In this example two different creams are used being vanilla and chocolate, the sandwich having two creamed layers. A topping wafer is supplied from magazine 27, which joins the creamed wafers on the conveyor 16.

Referring now to FIG. 5c and selection number 5c in the table, it will be seen that in this case the finished sandwich comprises three creamed layers, two of which issue from one cream dispenser. In this case, in a period of 1 minute, 15 wafers pass through dispenser A, thirty through dispenser B and 15 leave the magazine 27.

Referring now to FIG. 5d and selection number 5d in the table, all three cream dispensers are used, each to produce one creamed wafer. Thus, cam disc 43 actuates micro-switch 44 and thus the magazine of dispensers A, B and C three times for each revolution of the disc, and in a period of one minute, fifteen wafers issue from the magazines of all three dispensers and magazine 27. In this case, therefore, a sandwich having three creamed layers is produced using three different creams.

Referring now to FIG. 5e and selection number 5e in the table, it will be seen that all three cream dispensers are utilised, two of which are operated twice for every one operation of the third. Thus, cam discs 45 and 46 serve to actuate micro-switches 47 and 48 respectively to energise the magazine of dispenser A twice in each revolution, and the magazines of dispensers B and C 4 times. Therefore, in a period of 1 minute, 10 wafers issue from the magazine of dispenser A and from the magazine 27, whilst 20 wafers issue from each of the magazines of dispensers B and C. Thus a sandwich having five creamed layers is produced using three different creams.

It will be appreciated that by the provision of appropriate cam discs it is possible selectively, simultaneously and/or separately to energise the wafer feed magazines of the three cream dispensers along with energisation of the magazine 27 in order to produce any combination available within the limits of the creaming section, of creamed and topping wafers which may be presented at the wafer builder 17 for assembly.

The three cream dispensers shown are disposed as closely as possible to each other so that the wafers of each batch proceeding towards the builder are as closely aligned as possible.

It is not intended to limit the invention to the above example only, many variations such as might readily occur to one skilled in the art being possible without departing from the scope of the invention as defined in and by the appended claims.

What is claimed is:

1. Means for producing a multi-layered wafer sandwich comprising: a plurality of cream dispensers disposed in side-by-side relationship; a wafer feed magazine adjacent each cream dispenser for delivering uncreamed wafers thereto; means for actuating said cream dispensers in accordance with a predetermined programme, said actuating means including means for enabling simultaneous or separate operation of selected ones of said cream dispensers thus to produce a selected number of creamed wafers from each cream dispenser according to said programme; and common transfer means for receiving said creamed wafers individually from said cream dispensers and for combining and transferring the same together to an output conveyor for simultaneous conveyance to a wafer builder to produce a multi-layered wafer sandwich.

2. Apparatus according to claim 1, wherein said each cream dispenser is operatively connected to its associated wafer feed magazine, such that energisation thereof causes actuation of said cream dispenser.

3. Apparatus according to claim 1, wherein each said cream dispenser includes a conveyor for carrying wafers from the associated wafer feed magazine, and when creamed, to said transfer means.

4. Apparatus according to claim 1, including an input wafer conveyor having discharge means adjacent each wafer feed magazine to dispense wafer thereto from a main supply.

5. Apparatus according to claim 1, wherein a further wafer feed magazine is provided to feed an uncreamed topping wafer automatically upon operation of one or more of said cream dispensers, to said output conveyor for conveyance with said creamed wafers to said wafer builder.

6. Apparatus according to claim 1, wherein said common transfer means comprises roller conveyor means having roller section means for receiving creamed wafers from one of said cream dispensers and for transferring the same laterally with respect to the associated cream dispenser, stop means being provided to limit the degree of lateral movement.

7. Apparatus according to claim 6, wherein said roller conveyor means further includes means for transferring creamed wafers therefrom onto said output conveyor for conveyance to said wafer builder.

8. Apparatus accordig to claim 7, wherein a further wafer feed magazine is disposed at the input end of said output conveyor to supply thereto an uncreamed topping wafer for conveyance with said creamed wafer or wafers to said wafer builder.

9. Apparatus according to claim 1, wherein said enabling means comprises a plurality of switches one for each of said cream dispensers and connected to its associated wafer feed magazine for energisation thereof.

10. Apparatus according to claim 9, wherein said switches are operated respectively by a plurality of rotatable discs, each carrying a plurality of circumferentially spaced cams.

11. Apparatus according to claim 10, wherein said discs are mounted for rotation on a common shaft, there being a further disc mounted on said shaft and having a single cam for operating a further switch to initiate a selected cycle of operation of the apparatus.

12. Apparatus according to claim 1, forming part of a plant for producing finished wafer biscuits and comprising a wafer oven for supplying uncreamed wafers, a wafer builder for assembling creamed wafers issuing from said cream dispensers, means for adjusting the thickness of a wafer sandwich issuing from said builder, and a cutting device arranged to cut a sandwich into wafer biscuits of requisite shape and dimensions, conveying means being provided between the members of said plant thus to enable a continuous, substantially automatic process.

* * * * *